(No Model.) 2 Sheets—Sheet 1.
J. B. NICHOLS.
ATTACHMENT FOR MORTISING MACHINES.
No. 484,225. Patented Oct. 11, 1892.
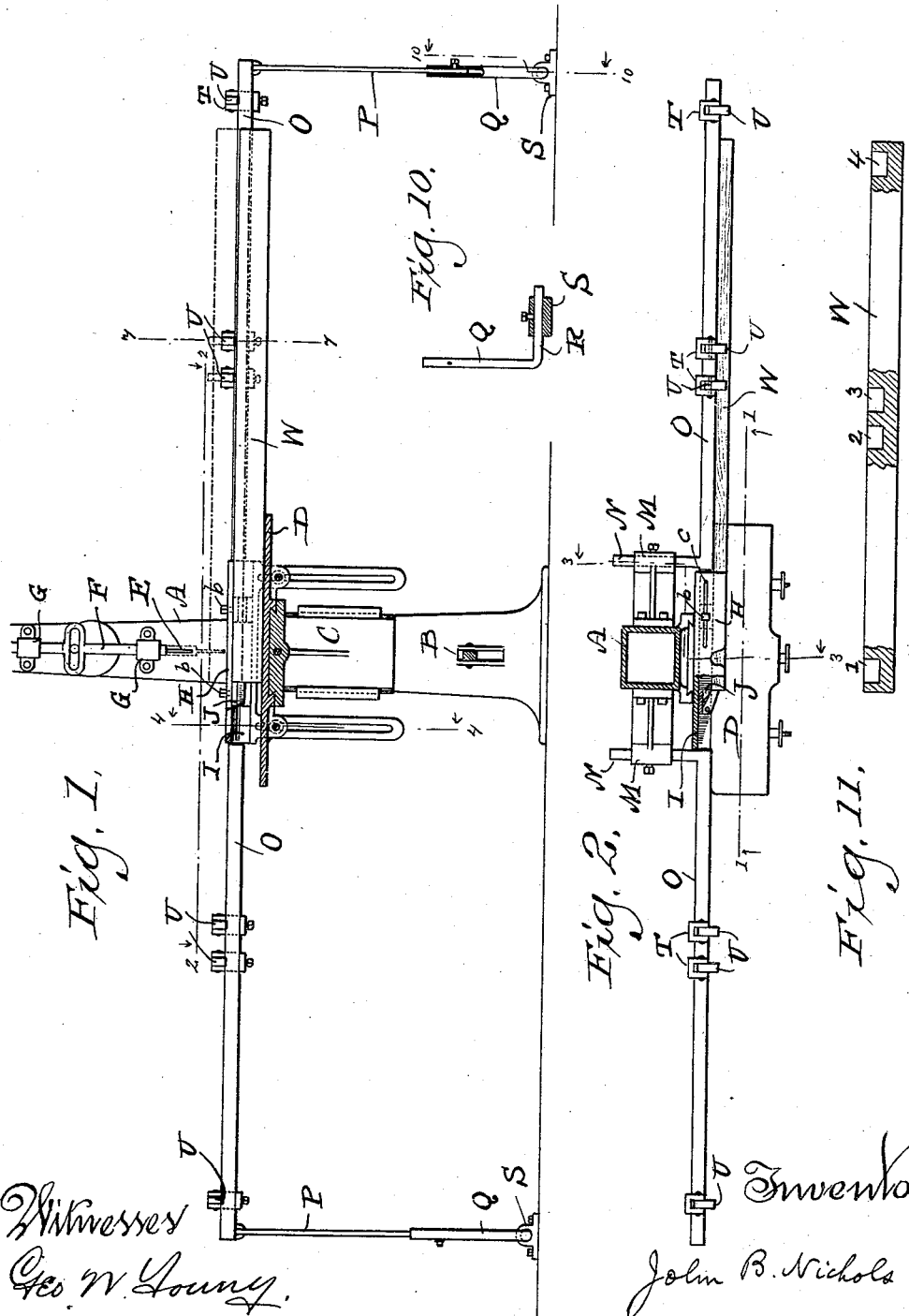
Witnesses
Geo. W. Young.
N. E. Oliphant
Inventor
John B. Nichols
By H. G. Underwood
Attorneys

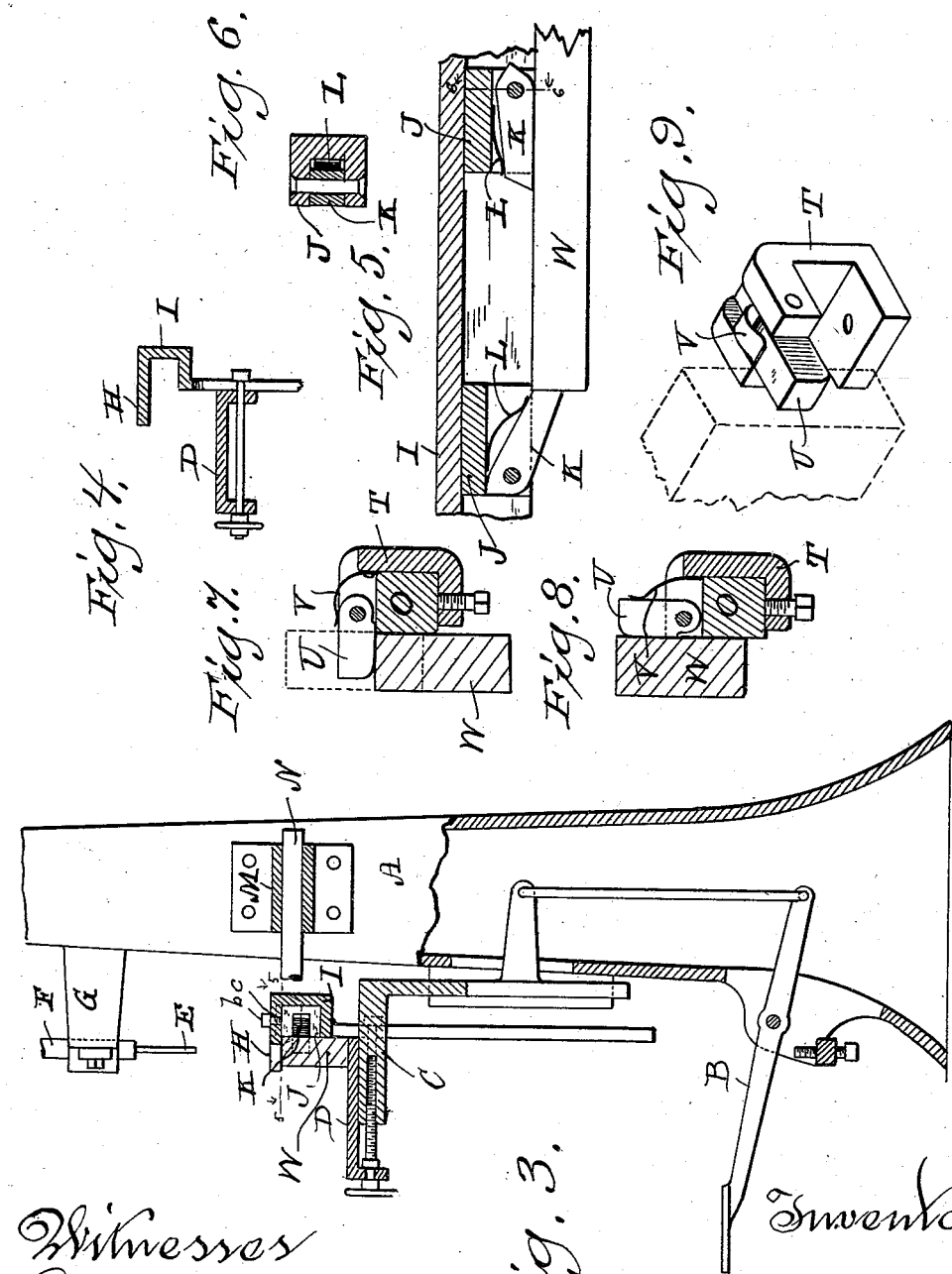
(No Model.) 2 Sheets—Sheet 2.
J. B. NICHOLS.
ATTACHMENT FOR MORTISING MACHINES.
No. 484,225. Patented Oct. 11, 1892.

UNITED STATES PATENT OFFICE.

JOHN B. NICHOLS, OF MILWAUKEE, WISCONSIN.

ATTACHMENT FOR MORTISING-MACHINES.

SPECIFICATION forming part of Letters Patent No. 484,225, dated October 11, 1892.

Application filed February 29, 1892. Serial No. 423,158. (No model.)

*To all whom it may concern:*

Be it known that I, JOHN B. NICHOLS, a citizen of the United States, and a resident of Milwaukee, in the county of Milwaukee, and in the State of Wisconsin, have invented certain new and useful Improvements in Attachments for Mortising-Machines; and I do hereby declare that the following is a full, clear, and exact description thereof.

My invention has for its object to provide mortising-machines with means for gaging the location and length of mortises to be cut, especially in stock-work, whereby the time necessary to lay out said mortises by marking may be saved; and to this end the said invention consists in certain peculiarities of construction and combination of parts to be hereinafter described with reference to the accompanying drawings and subsequently claimed.

In the drawings, Figure 1 represents a front elevation of a mortising-machine, partly in section, on line 1 1 of the succeeding figure and provided with my improvements; Fig. 2, a plan view of the same, partly in horizontal section, on line 2 2 of the preceding figure; Fig. 3, a side elevation, partly in section, on line 3 3 of Fig. 2; Fig. 4, a detail vertical section on line 4 4 of Fig. 1; Fig. 5, a detail horizontal section on line 5 5 of Fig. 3; Fig. 6, a detail tranverse section on line 6 6 of the preceding figure; Figs. 7 and 8, similar views on line 7 7 of Fig. 1, to illustrate two positions of one of a series of dogs that constitute part of my invention; Fig. 9, a detail perspective view of the parts shown in the two preceding sectional views; Fig. 10, a detail vertical section on line 10 10 of Fig. 1; and Fig. 11, an elevation, partly in section, of a piece of work done on a mortising-machine provided with my improvements.

Referring by letters and figures to the drawings, A represents the standard of an ordinary mortising-machine, and B a foot-lever fulcrumed to the standard and linked to a vertically-movable portion C, the latter, with another portion D horizontally adjustable thereon, constituting the compound table for the material to be worked upon by a chisel E, that has a reciprocative stock F arranged to work in suitable guides G on said standard. Adjustably connected to the compound table is the usual overhanging stop-plate H, that prevents the material on the table from rising with the chisel; but in the present instance I have shown this stop-plate as having an offset rear portion I in the form of an angular recess or seat for longitudinally-adjustable blocks J, that are held in their adjusted position by set-screws b, engaging longitudinal slots c in the upper horizontal portion of said stop-plate. Pivotally connected to each block J, so as to swing on a horizontal plane, is a dog K, and interposed between the block and dog is a spring L, as is best illustrated in Fig. 5.

As shown, each side of the standard A is provided with a guide M for an arm N, that extends rearward from the inner end of a bar O, positioned in rear of the horizontally-adjustable portion D of the compound table, above described, and the outer end of this bar is supported by a rod P, that is vertically adjustable in a sleeve Q, having a horizontal extension R, adjustable in a guide or bracket S, fast on the floor that supports said standard.

By adjusting the rod P the bar O may be readily set to a true level, and by adjusting the arm N and sleeve extension R the said bar may be as readily moved to such position on a horizontal plane as the thickness of the material to be worked may require. At this point in the description I desire it understood that it is possible to have a single bar O, extending a certain distance on opposite sides of the standard and centrally provided with the pivotal dogs K (described in connection with the stop-plate H) without departure from the spirit of my invention. It is also possible to have the bar O (singly or in the sections shown) connected to some portion of the table to be adjustable thereon and movable therewith, it being practical in such a case to make the stop-plate H a part of said bar or bars. These possible variations are merely a matter of mechanical expediency, to be determined by practical requirements, and as they are so obvious to those skilled in the art to which my invention relates illustration has not been deemed necessary.

Adjustable on the bars O herein shown are clamps T, of any number that may be found necessary or desirable, and pivotally connected to each clamp is a dog U, designed to normally project beyond the front face of the adjacent bar, as best illustrated in Figs.

2, 7, and 9. Interposed between each clamp and its relative dog is a spring V, and this spring is designed to prevent said dog from falling over toward the rear when thrown up in line with the front face of the adjacent bar O, to which said clamp is connected.

In Figs. 1 and 2 I have shown the several dogs above described positioned to permit of cutting a predetermined number of mortises in the arrangement shown in Fig. 11, and the operation is as follows: The piece of material W to be mortised is placed upon the table so as to push back one of the dogs K and have one end in opposition to the other of these dogs, the distance between this exposed dog and the outermost one of the dogs U on the right-hand bar O being equal to the length of said piece of material plus the length of the mortise 1 to be cut therein. Now if the table be elevated by a movement of the foot-lever connected thereto the work will be brought to the chisel and all but the outermost one of the dogs U on the right-hand bar thrown upon their pivots to stand in the position shown by dotted lines, Fig. 1, and in full lines, Fig. 8. The material on the table is now moved longitudinally between the dogs K U in opposition to its ends, and as the limit of this movement is predetermined the result of the action of the chisel during said movement is the mortise 1 of a length correspondent to the difference in length of said material and the distance between said dogs. To cut the mortise 2 in the material, the latter is positioned to push back both of the dogs K and have a longitudinal movement between the second dog from the outer end of the right-hand bar and that dog that is first from the inner end of the left-hand bar. To cut the mortise 3 in the material, the latter is positioned to be limited as to longitudinal movement between the dog that is third from the outer end of the right-hand bar and the one that is second from the inner end of the left-hand bar, while to cut the mortise 4 said material is positioned to be moved longitudinally between the right-hand dog K and the outermost dog U on the left-hand bar.

By the above description it will be seen that the number of mortises, their relative arrangement, and length of each may be predetermined by the number and position of the stop-dogs, thereby greatly facilitating the work, inasmuch as the material does not have to be marked to indicate the position and length of said mortises, while at the same time I guard against the latter being otherwise than mechanically correct.

Having now fully described my invention, what I claim as new, and desire to secure by Letters Patent, is—

1. As an attachment to a mortising-machine, a support arranged to extend laterally in opposite directions from said machine in rear of the work on the table portion of the same, and a series of upwardly-lifting stops connected to the support to normally extend outward therefrom, substantially as set forth.

2. As an attachment to a mortising-machine, a support arranged to extend laterally in opposite directions from said machine in rear of the work on the table portion of the same, and a series of upwardly-lifting but normally-horizontal stops adjustable on the support in the direction of its length, substantially as set forth.

3. As an attachment to a mortising-machine, spring-controlled stop-dogs longitudinally adjustable on opposite sides of the center of the machine, a support extended laterally on opposite sides of said machine in rear of the work on the table portion of the same, and a series of yielding stop-dogs adjustable on the support in the direction of its length, substantially as set forth.

4. As an attachment to a mortising-machine, a support extending laterally in opposite directions from the machine in rear of the work on the table portion thereof, a series of clamps adjustable on the support, and an upwardly-lifting dog pivotally connected to each clamp to normally extend outward from said support, substantially as set forth.

5. As an attachment to a mortising-machine, a support extending laterally in opposite directions from the machine in rear of the work on the table portion thereof, a series of clamps adjustable on the support, an upwardly-lifting dog pivotally connected to each clamp to normally extend outward from said support, and a spring interposed between each dog and its relative clamp, substantially as set forth.

6. As an attachment to a mortising-machine, a pair of spring-controlled stop-dogs longitudinally adjustable on opposite sides of the center of the machine and arranged to swing on a horizontal plane, a support extending laterally on opposite sides of said machine, and a series of pivotal stop-dogs adjustable on the support in the direction of the length of the same and arranged to normally extend from said support, substantially as set forth.

7. As an attachment to a mortising-machine, a recessed stop-plate, blocks longitudinally adjustable therein, a spring-controlled dog pivotally connected to each block, a bar adjustably connected to each side of the machine-standard, a series of clamps adjustable on each bar, and a dog pivotally connected to each clamp to normally extend from the adjacent bar, substantially as set forth.

In testimony that I claim the foregoing I have hereunto set my hand, at Milwaukee, in the county of Milwaukee and State of Wisconsin, in the presence of two witnesses.

JOHN B. NICHOLS.

Witnesses:
N. E. OLIPHANT,
JOHN E. WILES.